US011699101B2

(12) United States Patent
Dagan et al.

(10) Patent No.: US 11,699,101 B2
(45) Date of Patent: Jul. 11, 2023

(54) AUTOMATIC IMAGE SELECTION FOR ONLINE PRODUCT CATALOGS

(71) Applicant: eBay Inc., San Jose, CA (US)

(72) Inventors: Arnon Dagan, Kfar Vitkin (IL); Ido Guy, Haifa (IL); Alexander Nus, Herzeliya (IL); Raphael Bryl, Tel Aviv (IL); Noa Shimoni Barzilai, Rehovot (IL); Avinoam Omer, Shilat (IL); Yan Radovilsky, Netanya (IL); Einav Itamar, Herzliya (IL); Gadi Mikles, Petach (IL)

(73) Assignee: eBay Inc., San Jose, CA (US)

( * ) Notice: Subject to any disclaimer, the term of this patent is extended or adjusted under 35 U.S.C. 154(b) by 12 days.

(21) Appl. No.: 17/467,170

(22) Filed: Sep. 3, 2021

(65) Prior Publication Data

US 2021/0397894 A1 Dec. 23, 2021

Related U.S. Application Data

(63) Continuation of application No. 16/566,121, filed on Sep. 10, 2019, now Pat. No. 11,113,575.

(51) Int. Cl.
*G06N 20/00* (2019.01)
*G06N 3/08* (2023.01)
(Continued)

(52) U.S. Cl.
CPC ......... *G06N 20/00* (2019.01); *G06F 18/2148* (2023.01); *G06F 18/2178* (2023.01);
(Continued)

(58) Field of Classification Search
CPC .. G06K 9/6221; G06K 9/6257; G06K 9/6263; G06K 9/6278; G06N 20/00; G06N 3/0454; G06N 3/08; G06N 7/005
See application file for complete search history.

(56) References Cited

U.S. PATENT DOCUMENTS 7,856,380 B1 12/2010 Latin et al.
11,113,575 B2 9/2021 Dagan et al.
(Continued)

OTHER PUBLICATIONS

Telebi et al: "NIMA: Neural Image Assessment", IEEE, 2018, (Year: 2018).*
(Continued)

*Primary Examiner* — Ruiping Li
(74) *Attorney, Agent, or Firm* — Holland & Hart LLP

(57) ABSTRACT

Disclosed are systems, methods, and non-transitory computer-readable media for automatic image selection for online product catalogs. An image selection system gathers feature data for images of an item included in listings posted to an online marketplace. The image selection system uses the feature data as input in a machine learning model to determine probability scores indicating an estimated probability that each image is suitable to represent the item. The machine learning model is trained based on a set of training images of the item that have been labeled to indicate whether they are suitable to represent the image. The image selection system compares the probability scores and selects an image to represent the item as a stock image based on the comparison.

20 Claims, 9 Drawing Sheets

(51) Int. Cl.
  *G06F 18/214* (2023.01)
  *G06F 18/21* (2023.01)
  *G06F 18/2321* (2023.01)
  *G06V 10/764* (2022.01)
  *G06V 10/778* (2022.01)
  *G06V 20/70* (2022.01)
  *G06V 20/00* (2022.01)

(52) U.S. Cl.
  CPC ............ *G06F 18/2321* (2023.01); *G06N 3/08* (2013.01); *G06V 10/764* (2022.01); *G06V 10/7784* (2022.01); *G06V 20/35* (2022.01); *G06V 20/70* (2022.01)

(56) References Cited

U.S. PATENT DOCUMENTS

| | | | |
|---|---|---|---|
| 2012/0128239 A1* | 5/2012 | Goswami | G06F 16/24578 382/173 |
| 2013/0021344 A1 | 1/2013 | Wang et al. | |
| 2016/0379132 A1 | 12/2016 | Jin et al. | |
| 2018/0052905 A1 | 2/2018 | Zhicharevich et al. | |
| 2021/0073583 A1 | 3/2021 | Dagan et al. | |

OTHER PUBLICATIONS

Notice of Allowance Received for U.S. Appl. No. 16/566,121, dated May 7, 2021, 10 pages.

Barnes et al., "An integrative approach to the assessment of E-commerce Quality", Journal of Electronic Commerce Research, vol. 3, No. 3, 2002, retrieved from the internet: <http://web.csulb.edu/journals/jecr/issues/20023/paper2.pdf>, pp. 114-127.

Marchesotti et al., "Assessing the aesthetic quality of photographs using generic image descriptors", retrieved from the internet: <https://www.semanticscholar.org/paper/Assessing-the-aesthetic-quality-of-photographs-Marchesotti-Perronnin/13c10779f9c85bc1665edc17ead57dcd03f592e4>, last accessed on Nov. 26, 2019, 2011, 7 pages.

Talebi et al., "Introducing NIMA: Neural Image Assessment", retrieved from the internet: <https://ai googleblog.com/2017/12/introducing-nima-neural-image-assessment.html>, Dec. 18, 2017, 4 pages.

Tinio et al., "Image quality and the aesthetic judgment of photographs: Contrast, sharpness, and grain teased apart and put together.", Psychology of Aesthetics, Creativity, and the Arts, vol. 5(2), retrieved from the internet: <https://psycnet.apa.org/record/2010-23132-001>, 2011, 2 pages.

* cited by examiner

AUTOMATIC IMAGE SELECTION FOR ONLINE PRODUCT CATALOGS

CROSS-REFERENCE TO RELATED APPLICATIONS

This application is a continuation of U.S. patent application Ser. No. 16/566,121, filed Sep. 10, 2019, the disclosure of which is hereby incorporated herein by reference in its entirety.

TECHNICAL FIELD

Embodiments of the present disclosure relate generally to images and, more specifically, to automatic image selection for online product catalogs.

BACKGROUND

Selecting a stock image to represent an item or category of items is currently performed manually by a human. For example, a human reviewer selects the stock image from a group of images posted by various sellers for the item. In addition to being time and resource intensive, this process provides inconsistent results because each human reviewer may have different opinions on what constitutes a suitable stock image and relies on their personal preferences when deciding.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
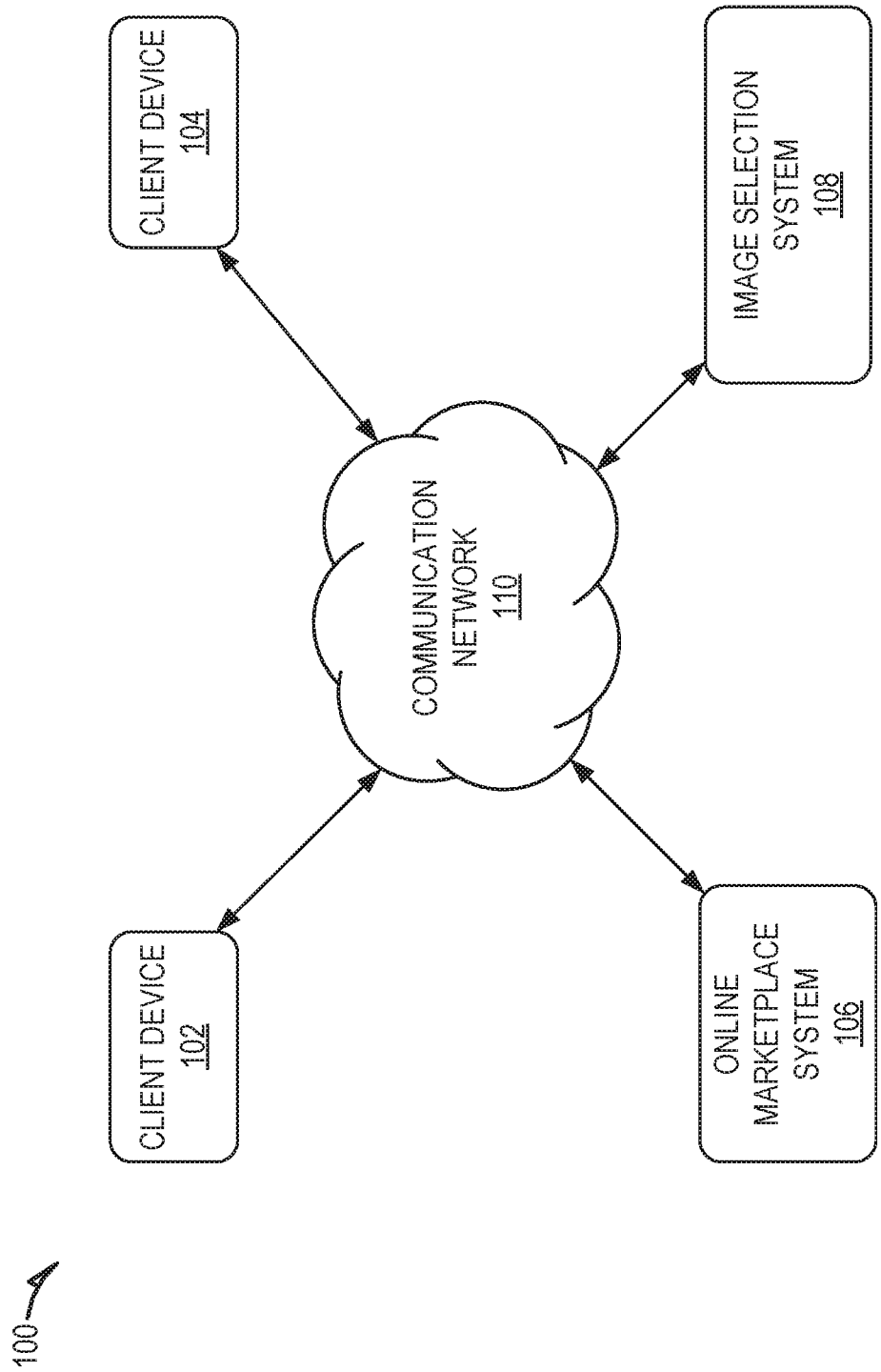
FIG. 1 shows a system configuration providing automatic image selection for online product catalogs, according to some example embodiments.

In the following description, for purposes of explanation, various details are set forth in order to provide a thorough understanding of various embodiments of the invention. It will be apparent, however, to one skilled in the art, that the present subject matter may be practiced without these specific details, or with slight alterations.

Reference in the specification to "one embodiment" or "an embodiment" means that a particular feature, structure or characteristic described in connection with the embodiment is included in at least one embodiment of the present subject matter. Thus, the appearances of the phrase "in one embodiment" or "in an embodiment" appearing in various places throughout the specification are not necessarily all referring to the same embodiment.

For purposes of explanation, specific configurations and details are set forth in order to provide a thorough understanding of the present subject matter. However, it will be apparent to one of ordinary skill in the art that embodiments of the subject matter described may be practiced without the specific details presented herein, or in various combinations, as described herein. Furthermore, well-known features may be omitted or simplified in order not to obscure the described embodiments. Various examples may be given throughout this description. These are merely descriptions of specific embodiments. The scope or meaning of the claims is not limited to the examples given.

Disclosed are systems, methods, and non-transitory computer-readable media for automatic image selection for online product catalogs. An online marketplace provides users with the ability to buy and sell items online. For example, the online marketplace allows sellers to post listings to the online marketplace that describe items that the sellers are offering for sale. Buyers may browse the posted listings and purchase the listed items they desire. Each listing may include images of the item listed for sale. For example, a seller may capture images of the item and upload the images to the online marketplace to be included in the listing. Buyers may view these posted images when evaluating whether to purchase the listed item.

To aid buyers in identifying specific items, the online marketplace may provide a list of the individual items or category of items that are listed for sale by the online marketplace. For example, the online marketplace may list item categories, such as smartphones, as well as list individual items, such as a particular make and model of a smart phone (e.g., iPhone X, Samsung Galaxy, etc.). Each listed individual item or category of items may be selectable by a buyer to cause the online marketplace to present the buyer with listings offering the individual item or items within the category for sale.

Each listed individual item or category of items may be assigned a stock image that represents the item or category of items. As explained earlier, this process is currently performed manually by human reviewers, which is inefficient and provides inconsistent results based on the varying personal preferences of the human reviewers. To alleviate this issue, the online marketplace utilizes an image selection system that automates the image selection process through use of a machine learning model that is trained to predict the suitability of an image for representing an individual item (e.g., product) or category of items.

The machine learning model is trained based on a set of training images and corresponding feature data. The training images include images from previous and/or current listings posted to the online marketplace that have been labeled and/or tagged to indicate whether the image is suitable for representing the item and/or category of items. The corresponding feature data may include a combination of various features describing the image and/or the listing that included the image. For example, the feature data may include item features describing the item in the listing (e.g., price, tool used to list item), seller features describing the seller of the item (e.g., number of listings or sales success), categorical features describing a category of the item (e.g., items sold in category), and image features describing the image itself (e.g., size, contrast, brightness or angle).

The resulting trained machine learning model outputs a probability value for an image based on the above listed features. That is, the machine learning model receives an image of an item as input and outputs a probability score indicating an estimated probability that the image is suitable to represent the item or a category of items. The image selection system uses the machine learning model to generate probability scores for multiple images of an item that are included in listings posted to the online marketplace and selects one of the images to represent the item or category of items based on the resulting probability scores. For example, the image selection system may select the image that has the highest probability score. The online marketplace assigns the image selected by the image selection system as the stock image for the item and/or category of items.

FIG. 1 shows an example system configuration 100 providing automatic image selection for online product catalogs, according to some example embodiments. As shown, multiple devices (i.e., a client device 102, client device 104, online marketplace system 106 and image selection system 108) are connected to a communication network 110 and configured to communicate with each other through use of the communication network 110. The communication network 110 is any type of network, including a local area network ("LAN"), such as an intranet, a wide area network ("WAN"), such as the Internet, or any combination thereof. Further, the communication network 110 may be a public network, a private network, or a combination thereof. The communication network 110 is implemented using any number of communication links associated with one or more service providers, including one or more wired communication links, one or more wireless communication links, or any combination thereof. Additionally, the communication network 110 is configured to support the transmission of data formatted using any number of protocols.

Multiple computing devices can be connected to the communication network 110. A computing device is any type of general computing device capable of network communication with other computing devices. For example, a computing device can be a personal computing device such as a desktop or workstation, a business server, or a portable computing device, such as a laptop, smart phone, or a tablet Personal Computer (PC). A computing device can include some or all of the features, components, and peripherals of the machine 900 shown in FIG. 9.

To facilitate communication with other computing devices, a computing device includes a communication interface configured to receive a communication, such as a request, data, etc., from another computing device in network communication with the computing device and pass the communication along to an appropriate processing module executing on the computing device. The communication interface also sends a communication (e.g., transmits data) to other computing devices in network communication with the computing device.

In the system 100, users interact with the online marketplace system 106 through use of the client devices 102 and 104 that are connected to the communication network 110 by direct and/or indirect communication to utilize the services provided by the online marketplace system 106. The online marketplace system 106 provides an online marketplace that enables users to post items for sale and purchase items posted for sale by other users. For example, the online marketplace service 160 may include items being auctioned for sale and/or items listed for sale at a set price.

Although the shown system 100 includes only two client devices 102, 104, this is only for ease of explanation and is not meant to be limiting. One skilled in the art would appreciate that the system 100 can include any number of client devices 102, 104. Further, the online marketplace system 106 may concurrently accept connections from and interact with any number of client devices 102, 104. The online marketplace system 106 supports connections from a variety of different types of client devices 102, 104, such as desktop computers; mobile computers; mobile communications devices, e.g., mobile phones, smart phones, tablets; smart televisions; set-top boxes; and/or any other network enabled computing devices. Hence, the client devices 102 and 104 may be of varying type, capabilities, operating systems, and so forth.

A user interacts with the online marketplace service 106 via a client-side application installed on the client devices 102 and 104. In some embodiments, the client-side application includes a component specific to the online marketplace system 106. For example, the component may be a stand-alone application, one or more application plug-ins, and/or a browser extension. However, the users may also interact with the online marketplace system 106 via a third-party application, such as a web browser, that resides on the client devices 102 and 104 and is configured to communicate with the online marketplace system 106. In either case, the client-side application presents a user interface (UI) for the user to interact with the online marketplace system 106. For example, the user interacts with the online marketplace system 106 via a client-side application integrated with the file system or via a webpage displayed using a web browser application.

The online marketplace system 106 is one or more computing devices configured to facilitate an online marketplace (e.g., EBAY, AMAZON) in which users (e.g., sellers) may generate and post listings that offer items for sale, and other users (e.g., buyers) may view the posted listings and choose to purchase the offered items if desired. For example, the online marketplace system 106 provides a user interface in which users may view item listings posted to the online marketplace service 106. Each item listing may provide details describing the item or items listed for sale. For example, the item listing may include an item description (e.g., written description), images, sale price, current bid price, auction time remaining, etc.

The online marketplace system 106 may further provide functionality that enables a user to purchase and/or bid on an item. For example, the online marketplace system 106 may provide user interface elements (e.g., button, text fields, etc.) that a user may use to select purchase an item, place a bid, etc., as well as provide financial (e.g., credit card number, bank account number) and personal information (e.g., shipping address, billing address, etc.) to complete the purchase.

To list an item for sale on the online marketplace, a user creates a user account with the online marketplace system 106. The user account may include the user's personal information (e.g., name, address, email address, phone number, etc.) and financial information (e.g., credit card information, bank account information, etc.). Once the user has created a user account, the user may then use their user account to utilize the functionality of the online marketplace system 106, including listing an item for sale on the online marketplace. The online marketplace system 106 provides users with a listing interface that enables a user to create a new listing as well as provide data for the listing. For example, the listing interface may include data fields that prompt the user to provide specified information for the listing, such as the price, description, etc. The listing interface may also include user interface elements, such as buttons, that enable the user to upload images of the items as well as submit and/or post the completed listing. That is, the user may post the listing after the user has filled in the data fields included in the listing interface.

To aid buyers in identifying specific items, the online marketplace system 106 may provide a list of the individual items or category of items that are listed for sale by the online marketplace system 106. For example, the online marketplace system 106 may provide a user interface that includes a list of item categories (e.g., smartphones, instruments, etc.), and/or individual items (e.g., iPhone X, Samsung Galaxy, Fender Stratocaster, Gibson SG, etc.). Each listed individual item or category of items may be selectable within the user interface to cause presentation of individual listings offering the specific item or category of items for sale. For example, a buyer may select the item category for musical instruments to be presented with listings posted to the online marketplace system 106 that offer a variety of musical instruments (e.g., guitars, drums, keyboards, etc.) for sale. Alternatively, a buyer may select the individual item Fender Stratocaster to be presented only with listings offering Fender Stratocasters for sale.

Each listed individual item or category of items may be assigned a stock image that represents the item or category of items. The stock image provides a visual aid for buyers that identifies the individual item or category of items. As explained earlier, the process of selecting and assigning a stock image is currently performed manually by human reviewers. This process is both inefficient and results in inconsistent results. For example, manually assigning the stock images requires human reviewers to manually view and grade multiple images, which is a slow and tedious process. Further, the grades provided by the human reviewers may be inconsistent based on the varying personal preferences of the human reviewers. For example, an image that one reviewer believes to be suitable as a stock image may be deemed unsuitable by another reviewer.

To alleviate this issue, the online marketplace system 106 utilizes the functionality of the image selection system 108 to automate the image selection process. Although the image selection system 108 is shown separately from the online marketplace system 106, this is for ease of explanation and is not meant to be limiting. In some embodiment, some or all of the functionality of the image selection system 108 is incorporated as part of the online marketplace system 106.

The image selection system 108 selects stock images for an item or category of items through use of a machine learning model that is trained to predict the suitability of an image for representing an individual item (e.g., product) or category of items. That is, the machine learning model receives an image and data identifying an item or category of items as input and outputs a probability score indicating how suitable the image is to represent the item or category of items. An image that is assigned a relatively higher probability score is determined to be better suited as a stock image to represent the item or category of items than an image that is assigned a relatively lower probability score.

The image selection system 108 may determine probability scores for multiple images of an item or a category or items that are included in listings posted to the online marketplace system 106. The image selection system 108 may then select one of the images to be the stock image for the item or category of items based on the determined probability scores. For example, the image selection system 108 may select the image with the highest probability score or an image that is assigned a probability score above a predetermined threshold score.

The image selection system 108 may repeat this process for multiple items and/or categories of items. For example, the image selection system 108 may determine probability scores for sets of images for each item and/or category of items and select a stock image for each item and/or category of items based on the determined probability scores.

Image suitability may be based on a variety of factors, such as image brightness, contrast, resolution, background color, existence of Watermarks or Graffiti text, whether the item in question is clearly discernible from the image, etc. For example, image suitability may be based on the size of the image, such as defining a minimum and maximum size range. Angle view is another factor for image suitability, such as whether the angle provides for a good understanding of what the captured item or product is and whether the angle provides an optimal view. The background may be a factor as well. For example, messy or busy backgrounds may distract from the item captured in the image. Accordingly, simple and plain backgrounds that are a solid color, such as white or off-white, may be preferred. Other factors may include whether the image includes a box or other packaging or whether a human is visible or partially visible. Watermarks or Graffiti may be acceptable, however are also a factor that may be considered when determining suitability. Other factors that may be considered are whether there are multiple images or views within the image, if the image is blurry/clear, whether the image is cropped, etc.

In contrast to human reviewers that rate images based on only the visual aspects of the image, the machine learning model used by the image selection system 108 considers a combination of various types of data describing not only the image, but also the item or category of items, the listing that included the image, and the seller that posted the listing. For example, the feature data may include item features describing the listing that included the image, such as the price associated with the listing, the tool used by the seller to list the item, the number of days the item has been active, the number of views the listing has received, etc. The feature data may also include seller features describing the seller that posted the listing, such as the number of listings posted by the seller, historical sale success of the seller, average number of views for listings posted by the seller, etc. The features data may also include categorical features describing the item or category of the item, such as the number of items sold in the category, the historical sale success of the item, an average number of days that the item is listed prior to sale, etc. The features data may also include image features describing the image itself, such as the size of image, contrast, brightness, angle at which the item is shown, size of item in the image, size of item within the image, etc.

The image selection system 108 gathers this combination of feature data from the online marketplace system 106 for each image. The image selection system 108 provides the gathered feature data as input into the machine learning model to determine the probability score associated with each image.

Similarly, the image selection system 108 trains the machine learning model based on a set of training images and the combination of feature data. The training images include images from previous and/or currently listings posted to the online marketplace system 106. The image selection system 108 gathers the combination of feature data for the training images from the online marketplace system 106. Each training image is additionally labeled and/or tagged (e.g., by a human reviewer) to indicate whether the image is suitable for representing the item and/or category of items.

Figure 2:
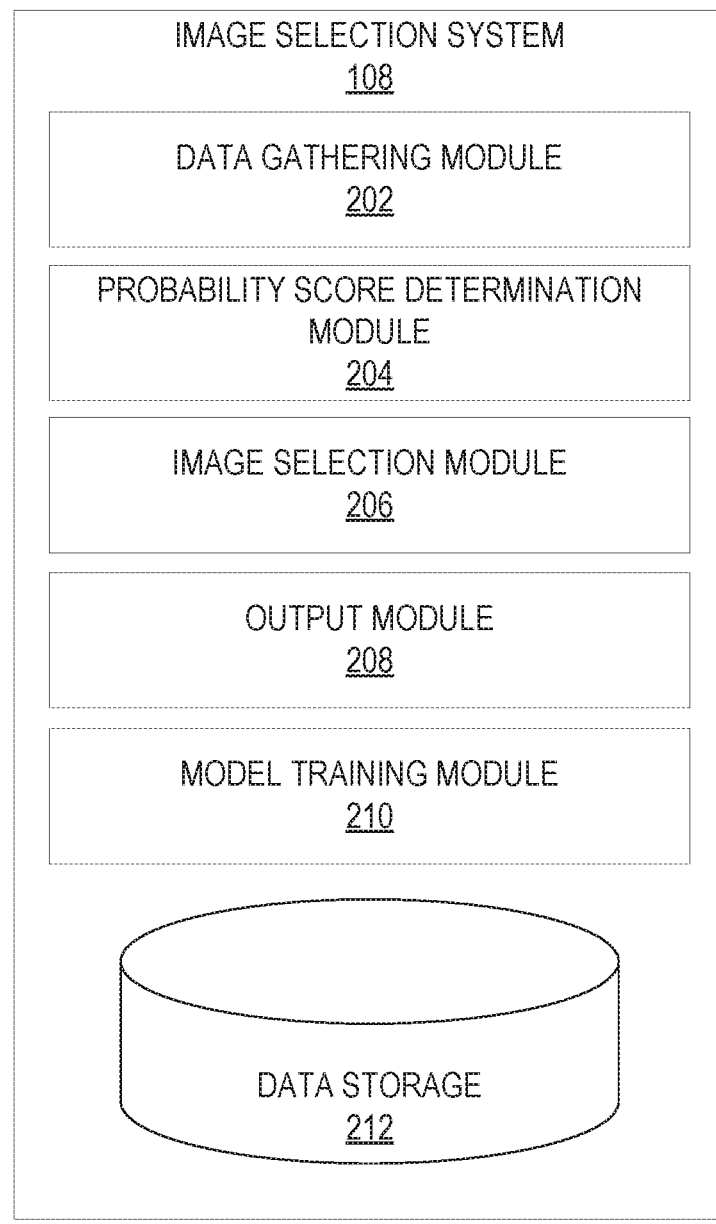
FIG. 2 is a block diagram of the image selection system, according to some example embodiments.

FIG. 2 is a block diagram of the image selection system 108, according to some example embodiments. To avoid obscuring the inventive subject matter with unnecessary detail, various functional components (e.g., modules) that are not germane to conveying an understanding of the inventive subject matter have been omitted from FIG. 2. However, a skilled artisan will readily recognize that various additional functional components may be supported by the image selection system 108 to facilitate additional functionality that is not specifically described herein. Furthermore, the various functional modules depicted in FIG. 2 may reside on a single computing device or may be distributed across several computing devices in various arrangements such as those used in cloud-based architectures.

As shown, the image selection system 108 includes a data gathering module 202, a probability score determination module 204, an image selection module 206, an output module 208, a model training module 210, and a data storage 212.

The data gathering module 202 gathers data that is used by the image selection system 108 to select a stock image to represent an item or category of items. As explained earlier, the data gathering module 202 uses a machine learning model that outputs a probability score indicating an estimated probability that an image is suited to represent an item or category of items as a stock image. The machine learning model uses a combination of different types of feature data to determine the probability score for an image. For example, the feature data may include item features describing the listing that included the image, such as the price associated with the listing, the tool used by the seller to list the item, the number of days the item has been active, the number of views the listing has received, etc. The feature data may also include seller features describing the seller that posted the listing, such as the number of listings posted by the seller, historical sale success of the seller, average number of views for listings posted by the seller, etc. The features data may also include categorical features describing the item or category of the item, such as the number of items sold in the category, the historical sale success of the item, an average number of days that the item is listed prior to sale, etc. The features data may also include image features describing the image itself, such as the size of image, contrast, brightness, angle at which the item is shown, size of item in the image, size of item within the image, etc.

The data gathering module 202 gathers the feature data used by the machine learning model from the online marketplace system 106. For example, the data gathering module 202 communicates with the online marketplace system 106 to request the feature data. In embodiments in which the image selection system 108 in incorporated as part of the online marketplace system 106, the data gathering module 202 may gather the feature data from the data storage 212, which stores user profile and listing data for the online marketplace system 106. The data gathering module 202 may gather a set of featured data for multiple images of an item or category of items. The data gathering module 202 provides the gathered feature data to the probability score determination module 204.

The probability score determination module 204 uses feature data associated with an image as input into a machine learning model to determine a probability score indicating the estimated probability that the image is suitable to represent an item or category of items as a stock image. The classification process performed by the probability score determination module 204 is described in greater detail below in relation to FIG. 5. The probability score determination module 204 repeats this process for multiple images of an item or a category of items, which results in a set of probability scores for the images of the item of category of items.

The image selection module 206 selects an image to represent the item or category of items as a stock image based on the set of probability scores for the images of the item of category of items. For example, the image selection module 206 may select the image with the highest probability score. As another example, the image selection module 206 may select an image that has a probability score that exceeds a threshold probability scores.

The output module 208 provides data identifying the image selected by the image selection module 206 to be the stock image for an item or category of items to the online marketplace system 106. The online marketplace system 106 may then assign the identified image as the stock image when including the item or category of items in a list to users of the online marketplace system 106.

The model training module 210 trains the machine learning model used by the image selection system 108. As explained earlier, the machine learning model is trained using a set of training images and a variety of associated feature data. The training images may include images from historical listings that were previously posted to the online marketplace system 106. Each training image may be labeled or tagged by a human reviewer to indicate whether the training image is or is not suitable to represent an item or category of items. For example, each training image may be tagged with a 1 or 0 to indicate whether the image is or is not suitable to represent the item or category of items. As another example, a wider range of values may be used (e.g., 0-5) to indicate a level at which the image is suitable to represent the item or category of items.

The model training module 210 uses the labeled training images and associated feature data to generate (e.g., train, validate and test) the machine learning model. This process is described in greater detail below in relation to FIGS. 3 and 4. The resulting machine learning model provides a probability score for a given input image that indicates an estimated probability that the image is suitable to represent a given item or category of items.

Figure 3:
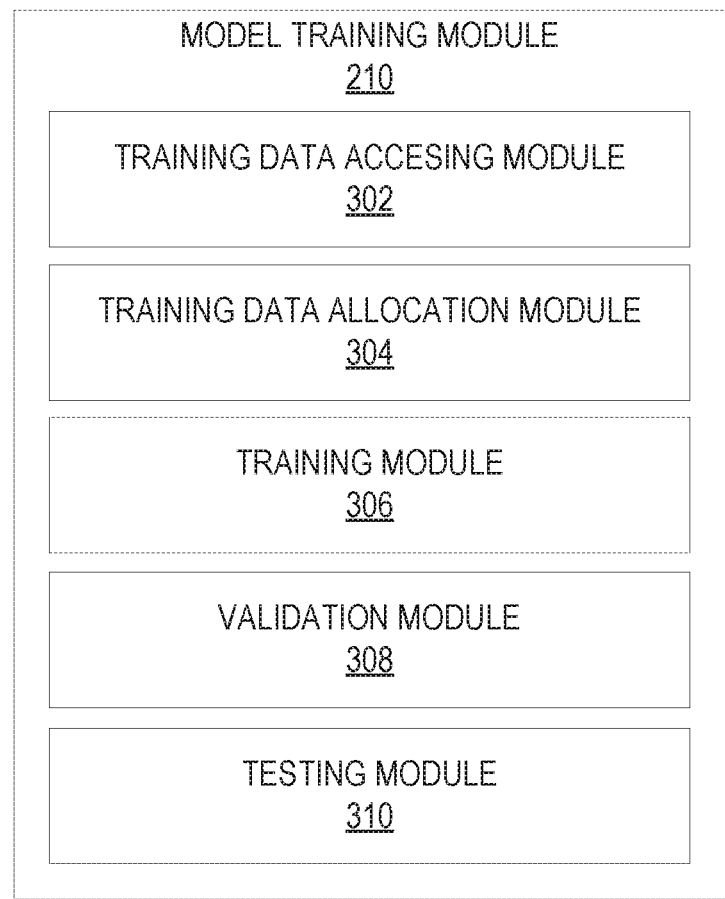
FIG. 3 is a block diagram of the model training module, according to some example embodiments

FIG. 3 is a block diagram of the model training module 210, according to some example embodiments. To avoid obscuring the inventive subject matter with unnecessary detail, various functional components (e.g., modules) that are not germane to conveying an understanding of the inventive subject matter have been omitted from FIG. 3. However, a skilled artisan will readily recognize that various additional functional components may be supported by the model training module 210 to facilitate additional functionality that is not specifically described herein. Furthermore, the various functional modules depicted in FIG. 3 may reside on a single computing device or may be distributed across several computing devices in various arrangements such as those used in cloud-based architectures.

As shown, the model training module 210 includes a training data accessing module 302, training data allocation module 304, training module 306, validation module 308, and testing module 310.

The training data accessing module 302 accesses the training data (e.g., labeled training images and corresponding feature data) that is used to generate the machine learning model. The training data accessing module 302 may access the training data from the data storage 212 and/or from the online marketplace system 106. The training data may include multiple sets of training data that are each associated with a specific item or category of items. That is, each set of training data includes images depicting a specified item or items that are within a specified category of items. Each set of training data is used separately to train the machine learning model to determine probability scores for the respective item or category of items.

The training data allocation module 304 allocates training data from each set of training data for either training, validation or testing the machine learning model for the item or category of items associates with the set of training data. In some embodiments, the training data allocation module 304 allocates a majority of the training data to training the machine learning model and a smaller percentage for verification and testing. For example, the training data allocation module 304 may allocate 80% of the training data for training the machine learning model and 10% of the training data to each validation and testing of the machine learning model.

The training module 306 trains the machine learning model based on the training data allocated for training. In some embodiments, the training module 306 separates the visual and textual features of the training data and uses the separated visual and textual features to train separate models within the machine learning model. For example, one model outputs a probability score based on the visual features, while the other model outputs a probability score based on the textual features. The training module 306 trains a combiner that generates a final probability score for an image based on the probability score generated based on the visual features and the probability score generated based on the textual features. The training flow performed by the training module 306 is discussed in greater detail in relation to FIG. 4.

The validation module 308 performs a validation process during training of the machine learning model. The validation process uses the set of training data allocated for validation to tune the parameters of the trained model. For example, the validation module 308 may use cross-validation or other various similar model validation techniques. The validation process uses the training data allocated to validation to estimate how accurately the machine learning model will perform. The machine learning model may be adjusted based on the results of the validation process to further fine tune the machine learning mode.

The testing module 310 tests performance of the generated machine learning model using training data that was not used during training of the machine learning model (e.g., the training data allocated to testing). The testing module 310 uses this training data as input into the generated machine learning model to generate probability scores. The testing module 310 then compares the resulting probability scores to the human provided labels to evaluate how well the machine learning model is performing. For example, the testing module 310 determines the that machine learning model is performing well if a higher percentage of the images are assigned probability scores that are in line with the human provided labels. The testing module 310 may provide feedback to the training module 306 and/or validation module 308 for use in further refining the machine learning model.

Figure 4:
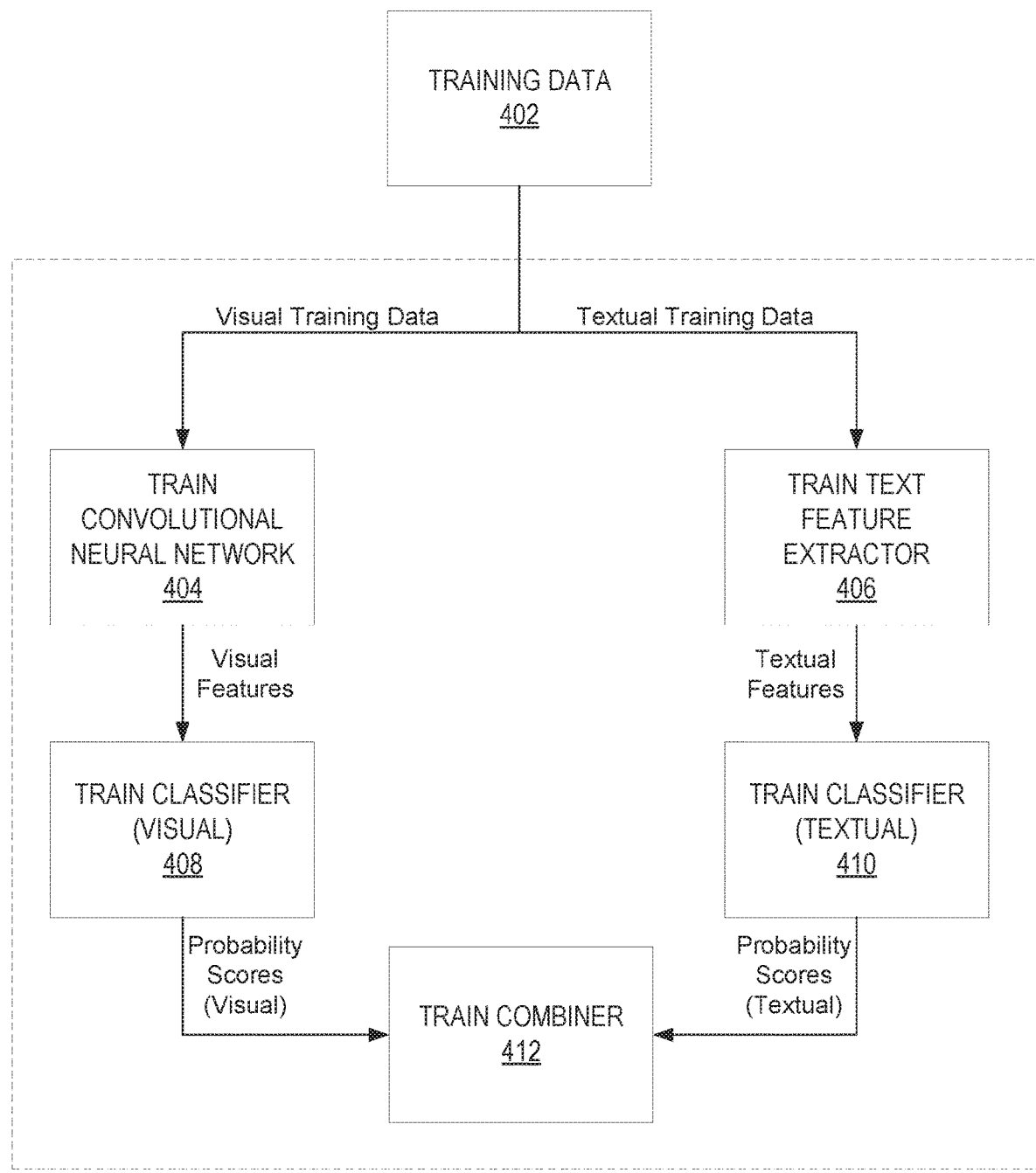
FIG. 4 is a flow diagram of training the machine learning model, according to some example embodiments.

FIG. 4 is a flow diagram of training the machine learning model, according to some example embodiments. To avoid obscuring the inventive subject matter with unnecessary detail, various details that are not germane to conveying an understanding of the inventive subject matter have been omitted from FIG. 4. However, a skilled artisan will readily recognize that various additional detail may be performed by the training module 306 to facilitate additional functionality that is not specifically described herein.

As shown, the training module 306 uses training data to train the machine learning model. The training data includes images of items that have been labeled by human reviewers, as well as associated data, such as data regarding the listing, item, seller, etc. The training module 306 splits the training data 402 in to visual training data and textual training data. The visual training data is based on the visual features of the image, such as those derived from the image itself, whereas the textual training data includes textual features, such as data from the listing, seller profile, etc.

The training module 306 uses the visual training data and corresponding labels assigned by human reviewers to train a convolutional neural network 404. The convolutional neural network outputs visual features based on the visual training data. The training module 306 uses the resulting visual features output by the convolutional neural network to train a visual classifier 408. For example, the visual classifier may be a Bayesian classifier. The visual classifier outputs probability scores based on the visual features.

The training module 306 uses the textual training data and corresponding labels assigned by human reviewers to train a text feature extractor 406. The text feature extractor outputs textual features based on the textual training data. The training module 306 uses the resulting textual features output by the convolutional neural network to train a textual classifier 410. For example, the textual classifier may be a Bayesian classifier. The textual classifier outputs probability scores based on the textual features.

The training module 306 uses the resulting visual and textual based probability scores along with the corresponding labels assigned by human reviewers to train a combiner 412. The combiner 412 generates a final probability score based on the visual and textual based probability scores.

Figure 5:
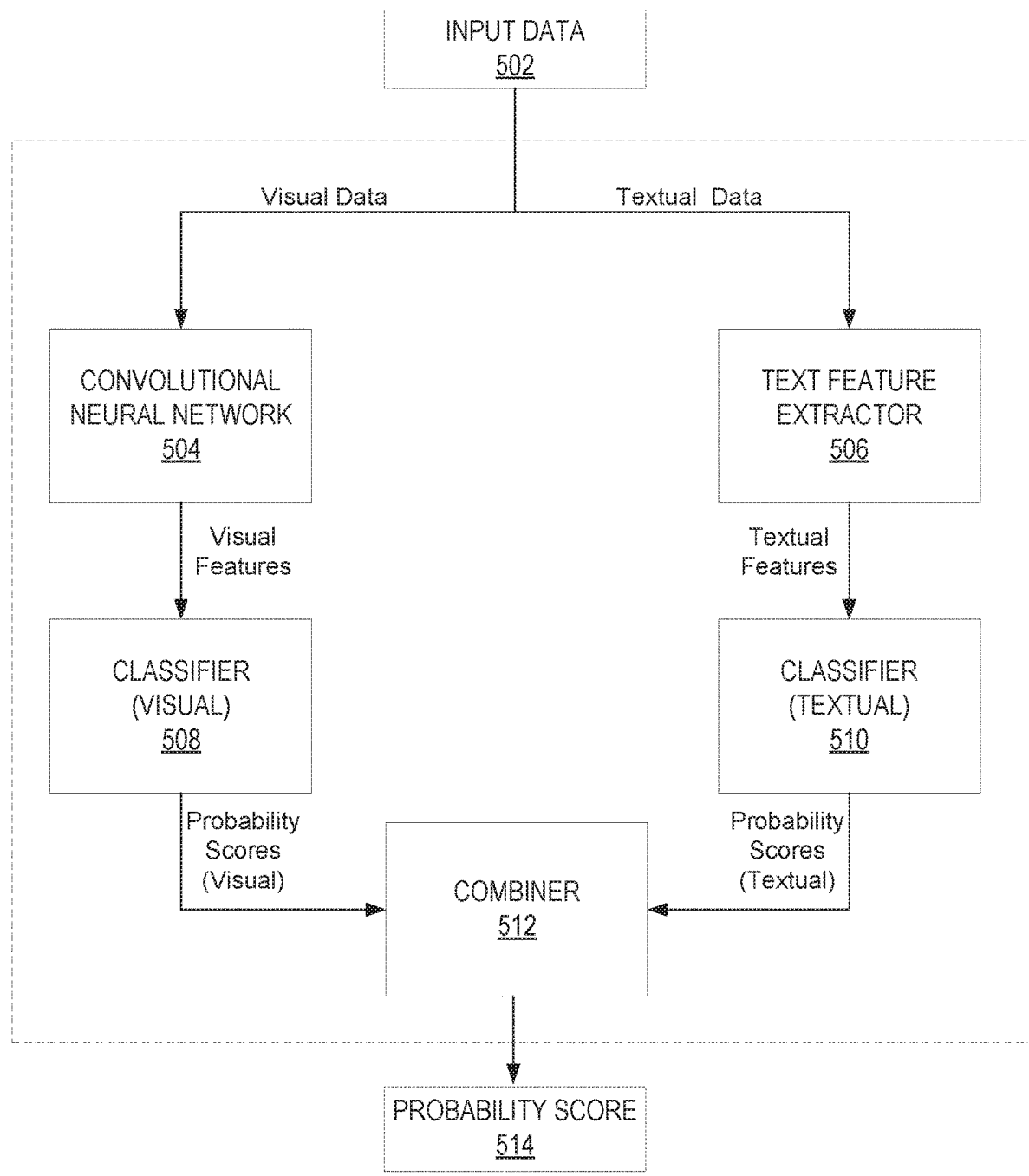
FIG. 5 is a flow diagram of classifying an image using the machine learning model, according to some example embodiments

FIG. 5 is a flow diagram of classifying an image using the machine learning model, according to some example embodiments. To avoid obscuring the inventive subject matter with unnecessary detail, various details that are not germane to conveying an understanding of the inventive subject matter have been omitted from FIG. 5. However, a skilled artisan will readily recognize that various additional detail may be performed by the probability score determination module 204 to facilitate additional functionality that is not specifically described herein.

As shown, the probability score determination module 204 provides input data 502 into a machine learning model that outputs a probability score 514. The input data 502 includes an image that was included in a listing posted by the online marketplace system 106, data identifying an item or category of items, and other data associated with the image, such as data describing the listing, item, seller, category, etc. The probability score determination module 204 splits the input data 502 into visual input data and textual input data. The visual input data is based on the visual features of the image, such as those derived from the image itself, whereas the textual input data includes textual features, such as data from the listing, seller profile, etc.

The probability score determination module 204 uses the visual input data as input into a convolutional neural network 504. The convolutional neural network 504 outputs visual features based on the visual training data. The probability score determination module 204 then uses the resulting visual features output by the convolutional neural network 504 as input into the visual classifier 508. In turn, the visual classifier 508 outputs a probability score based on the visual features of the input data.

The probability score determination module 204 uses the textual input data as input into a text feature extractor 506. The text feature extractor 506 outputs textual features based on the textual training data. The probability score determination module 204 then uses the resulting textual features output by the text feature extractor 506 as input into the textual classifier 510. In turn, the textual classifier 510 outputs a probability score based on the textual features of the input data. The probability score determination module 204 uses the resulting visual and textual based probability scores as input into the combiner 512. The combiner 512 generates a final probability score based on the visual and textual based probability scores.

Figure 6:
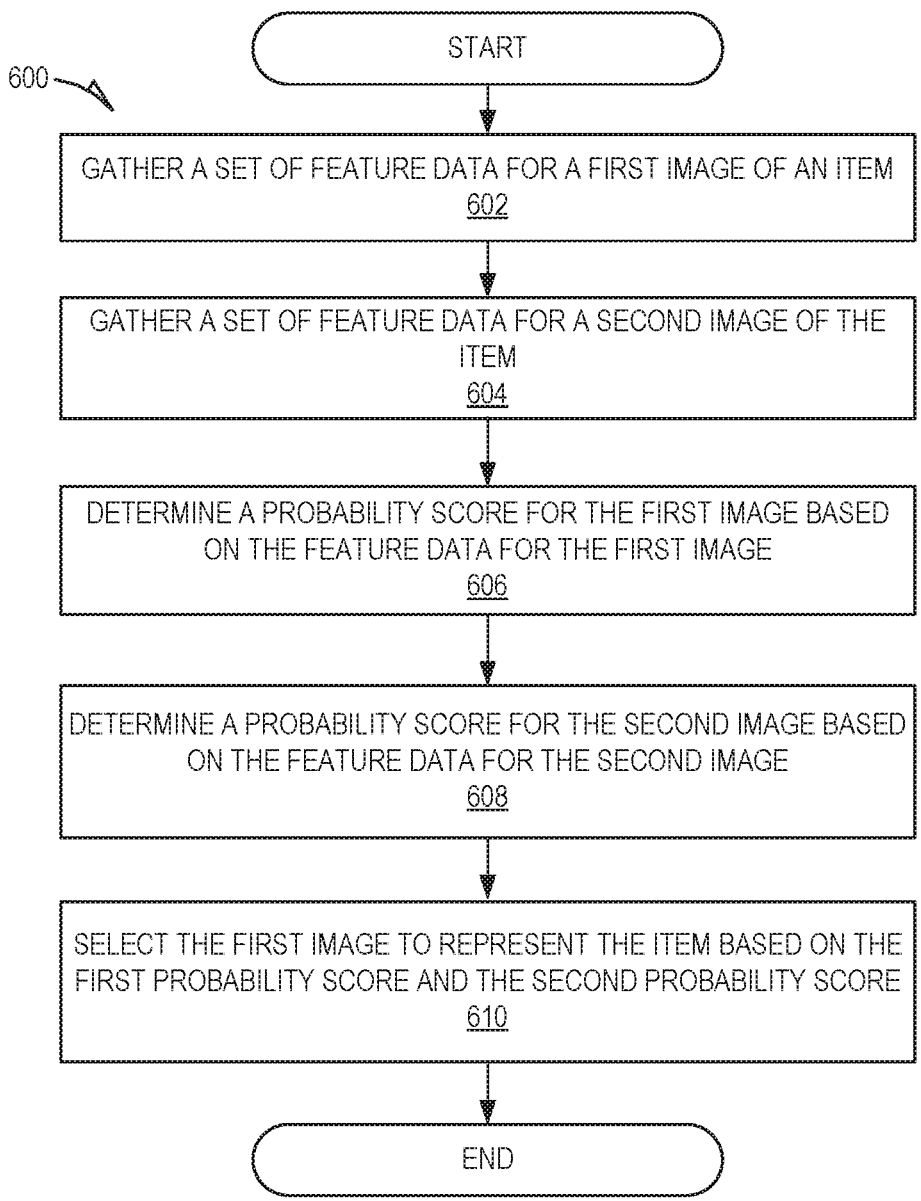
FIG. 6 is a flowchart showing a method of selecting an image using a machine learning model, according to some example embodiments.

FIG. 6 is a flowchart showing a method 600 of selecting an image using a machine learning model, according to some example embodiments. The method 600 may be embodied in computer readable instructions for execution by one or more processors such that the operations of the method 600 may be performed in part or in whole by the image selection system 108; accordingly, the method 600 is described below by way of example with reference thereto. However, it shall be appreciated that at least some of the operations of the method 600 may be deployed on various other hardware configurations and the method 600 is not intended to be limited to the image selection system 108.

At operation 602, the data gathering module 202 gathers a set of feature data for a first image of an item. The data gathering module 202 gathers the feature data from the online marketplace system 106. For example, the data gathering module 202 communicates with the online marketplace system 106 to request the feature data. In embodiments in which the image selection system 108 is incorporated as part of the online marketplace system 106, the data gathering module 202 may gather the feature data from the data storage 212, which stores user profile and listing data for the online marketplace system 106.

At operation 604, the data gathering module 202 gathers a set of feature data for a second image of the item.

At operation 606, the probability score determination module 204 determines a probability score for the first image based on the feature data for the first image. The probability score determination module 204 uses the feature data for the first image as input into a machine learning model that outputs the probability score. The resulting probability score indicates an estimated probability that the first image is suitable to represent an item or category of items as a stock image.

At operation 608, the probability score determination module 204 determines a probability score for the second image based on the feature data for the second image. For example, the probability score determination module 204 uses the feature data for the second image as input into the machine learning model. The resulting probability score indicates an estimated probability that the second image is suitable to represent the item or category of items.

At operation 610, the image selection module 206 selects the first image to represent the item based on the first probability score and the second probability score. The image selection module 206 selects an image to represent an item or category of items as a stock image based on the set of probability scores for the images of the item of category of items. For example, the image selection module 206 may select the image with the highest probability score. As another example, the image selection module 206 may select an image that has a probability score that exceeds a threshold probability scores.

Figure 7:
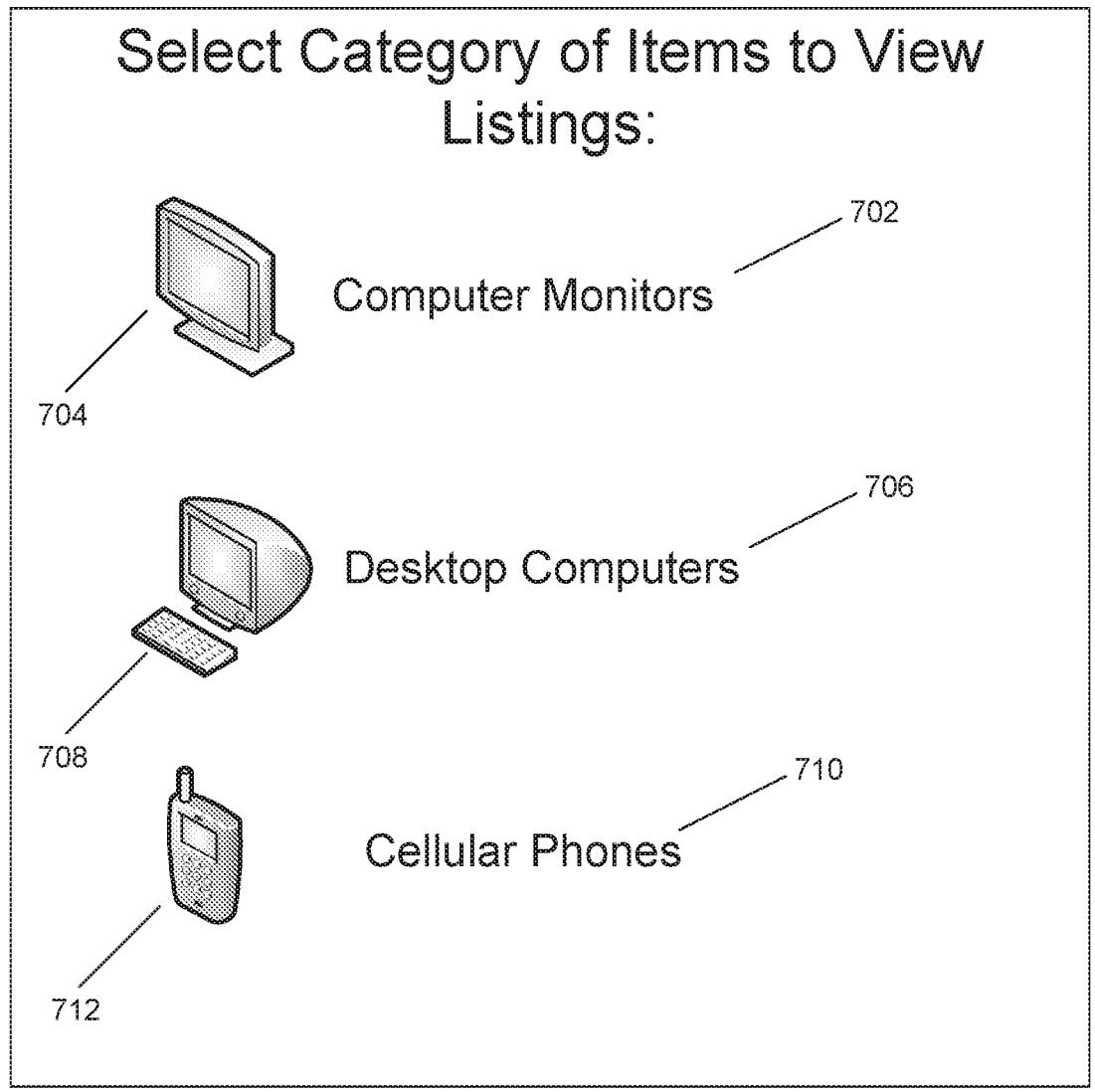
FIG. 7 is a screenshot showing a user interface presenting a list of items offered for sale on an online marketplace and corresponding stock images, according to some example embodiments.

FIG. 7 is a user interface 700 presenting a list of item categories offered for sale on an online marketplace and corresponding stock images, according to some example embodiments. As shown, each listed category of items 702, 706, 710 is presented along with an image 704, 708, 712 that represents the category of items. For example, the listed category of items "Computer Monitors" 702 is presented along with an image of a computer monitor 704. As another example, the listed category "Desktop Computers" 706 is presented along with an image of a desktop computer 708. Likewise, the listed category "cellular phone" 710 is presented along with an image of a cellular phone 712. Each listed category of items 702, 706, 710 may be selectable to cause presentation of listing offering items within the category of items 702, 706, 710 for sale. For example, a user that is interested in purchasing a computer monitor may select the listed category "computer monitors" 702 to be presented with listings posted to the online marketplace that offer computer monitors for sale. Likewise, a user that is interested in purchasing a desktop computer may select the listed category "desktop computer" 706 to be presented with listings posted to the online marketplace that offer desktop computers for sale.

Software Architecture

Figure 8:
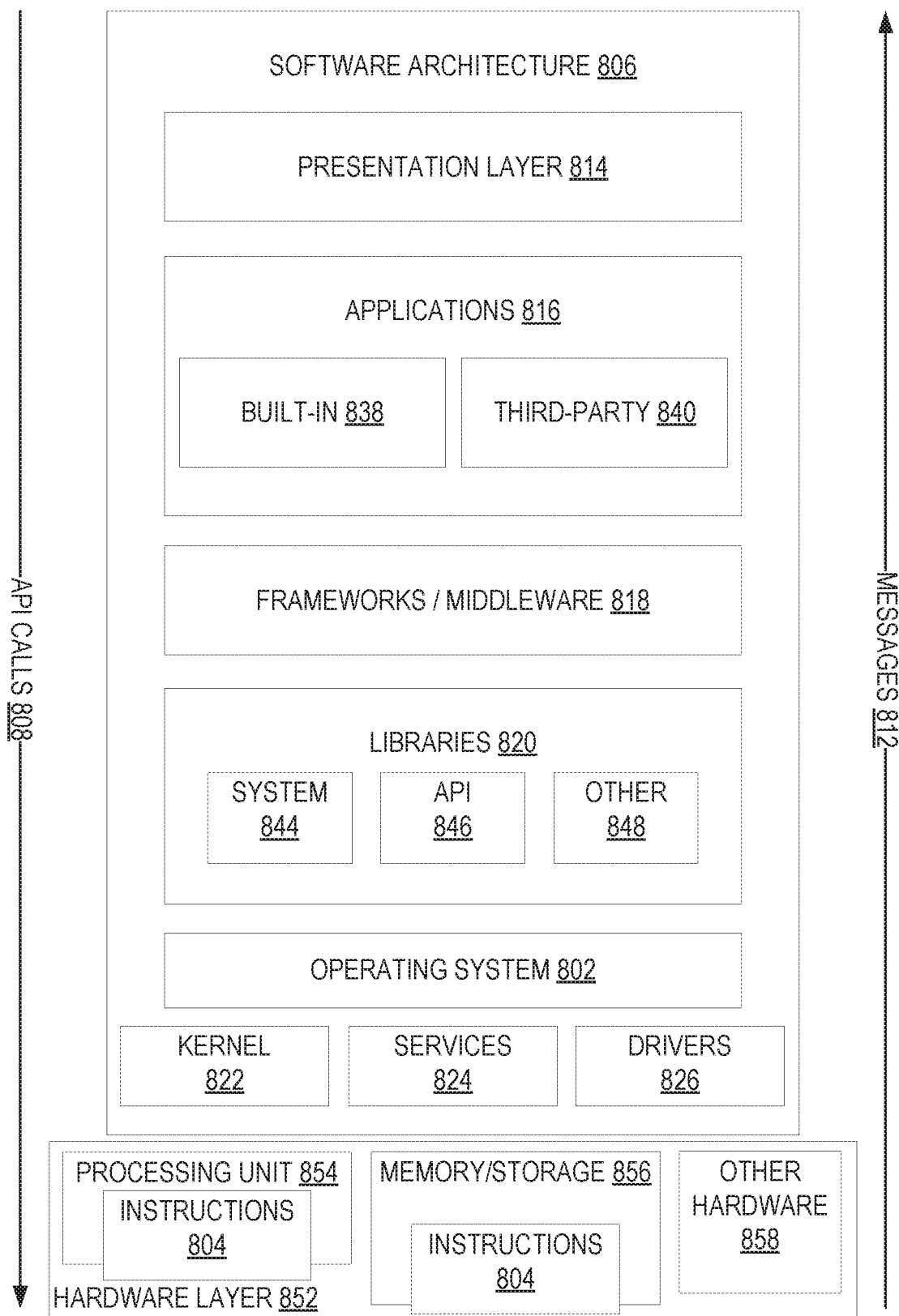
FIG. 8 is a block diagram illustrating a representative software architecture, which may be used in conjunction with various hardware architectures herein described.

FIG. 8 is a block diagram illustrating an example software architecture 806, which may be used in conjunction with various hardware architectures herein described. FIG. 8 is a non-limiting example of a software architecture 806 and it will be appreciated that many other architectures may be implemented to facilitate the functionality described herein. The software architecture 806 may execute on hardware such as machine 900 of FIG. 9 that includes, among other things, processors 904, memory 914, and (input/output) I/O components 918. A representative hardware layer 852 is illustrated and can represent, for example, the machine 900 of FIG. 9. The representative hardware layer 852 includes a processing unit 854 having associated executable instructions 804. Executable instructions 804 represent the executable instructions of the software architecture 806, including implementation of the methods, components, and so forth described herein. The hardware layer 852 also includes memory and/or storage modules memory/storage 856, which also have executable instructions 804. The hardware layer 852 may also comprise other hardware 858.

In the example architecture of FIG. 8, the software architecture 806 may be conceptualized as a stack of layers where each layer provides particular functionality. For example, the software architecture 806 may include layers such as an operating system 802, libraries 820, frameworks/middleware 818, applications 816, and a presentation layer 814. Operationally, the applications 816 and/or other components within the layers may invoke API calls 808 through the software stack and receive a response such as messages 812 in response to the API calls 808. The layers illustrated are representative in nature and not all software architectures have all layers. For example, some mobile or special purpose operating systems may not provide a frameworks/middleware 818, while others may provide such a layer. Other software architectures may include additional or different layers.

The operating system 802 may manage hardware resources and provide common services. The operating system 802 may include, for example, a kernel 822, services 824, and drivers 826. The kernel 822 may act as an abstraction layer between the hardware and the other software layers. For example, the kernel 822 may be responsible for memory management, processor management (e.g., scheduling), component management, networking, security settings, and so on. The services 824 may provide other common services for the other software layers. The drivers 826 are responsible for controlling or interfacing with the underlying hardware. For instance, the drivers 826 include display drivers, camera drivers, Bluetooth® drivers, flash memory drivers, serial communication drivers (e.g., Universal Serial Bus (USB) drivers), Wi-Fi® drivers, audio drivers, power management drivers, and so forth, depending on the hardware configuration.

The libraries 820 provide a common infrastructure that is used by the applications 816 and/or other components and/or layers. The libraries 820 provide functionality that allows other software components to perform tasks in an easier fashion than to interface directly with the underlying operating system 802 functionality (e.g., kernel 822, services 824 and/or drivers 826). The libraries 820 may include system libraries 844 (e.g., C standard library) that may provide functions such as memory allocation functions, string manipulation functions, mathematical functions, and the like. In addition, the libraries 820 may include API libraries 846 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 820 may also include a wide variety of other libraries 848 to provide many other APIs to the applications 816 and other software components/modules.

The frameworks/middleware 818 (also sometimes referred to as middleware) provide a higher-level common infrastructure that may be used by the applications 816 and/or other software components/modules. For example, the frameworks/middleware 818 may provide various graphic user interface (GUI) functions, high-level resource management, high-level location services, and so forth. The frameworks/middleware 818 may provide a broad spectrum of other APIs that may be used by the applications 816 and/or other software components/modules, some of which may be specific to a particular operating system 802 or platform.

The applications 816 include built-in applications 838 and/or third-party applications 840. Examples of representative built-in applications 838 may include, but are not limited to, a contacts application, a browser application, a book reader application, a location application, a media application, a messaging application, and/or a game application. Third-party applications 840 may include an application developed using the ANDROID™ or IOS™ software development kit (SDK) by an entity other than the vendor of the particular platform, and may be mobile software running on a mobile operating system such as IOS™, ANDROID™ WINDOWS® Phone, or other mobile operating systems. The third-party applications 840 may invoke the API calls 808 provided by the mobile operating system (such as operating system 802) to facilitate functionality described herein.

The applications 816 may use built in operating system functions (e.g., kernel 822, services 824 and/or drivers 826), libraries 820, and frameworks/middleware 818 to create user interfaces to interact with users of the system. Alternatively, or additionally, in some systems, interactions with a user may occur through a presentation layer, such as presentation layer 814. In these systems, the application/component "logic" can be separated from the aspects of the application/component that interact with a user.

Figure 9:
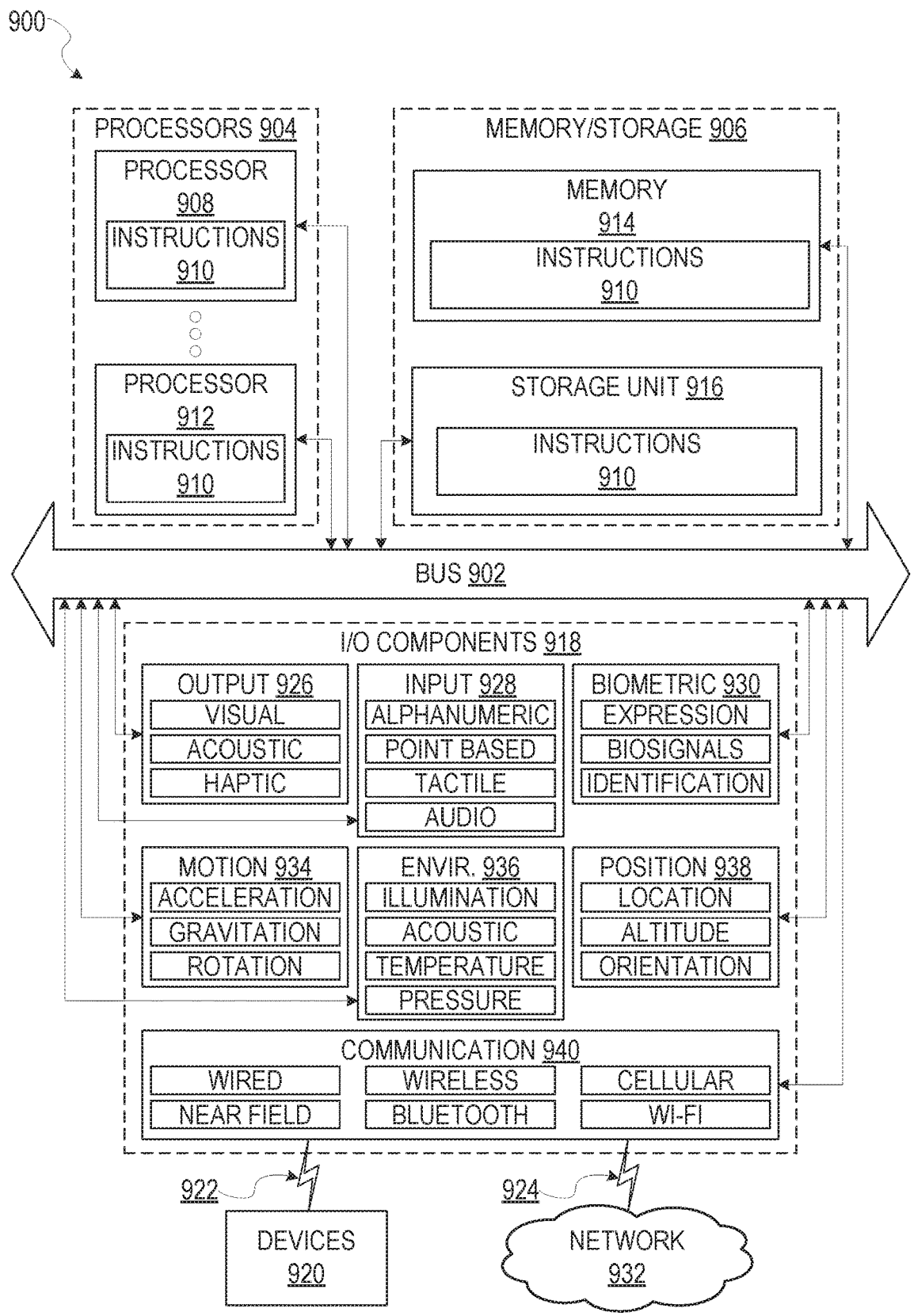
FIG. 9 is a block diagram illustrating components of a machine, according to some example embodiments, able to read instructions from a machine-readable medium (e.g., a machine-readable storage medium) and perform any one or more of the methodologies discussed herein.

FIG. 9 is a block diagram illustrating components of a machine 900, according to some example embodiments, able to read instructions from a machine-readable medium (e.g., a machine-readable storage medium) and perform any one or more of the methodologies discussed herein. Specifically, FIG. 9 shows a diagrammatic representation of the machine 900 in the example form of a computer system, within which instructions 910 (e.g., software, a program, an application, an applet, an app, or other executable code) for causing the machine 900 to perform any one or more of the methodologies discussed herein may be executed. As such, the instructions 910 may be used to implement modules or components described herein. The instructions 910 transform the general, non-programmed machine 900 into a particular machine 900 programmed to carry out the described and illustrated functions in the manner described. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine 900 capable of executing the instructions 910, sequentially or otherwise, that specify actions to be taken by machine 900. Further, while only a single machine 900 is illustrated, the term "machine" shall also be taken to include a collection of machines that individually or jointly execute the instructions 910 to perform any one or more of the methodologies discussed herein.

The machine 900 may include processors 904, memory/storage 906, and I/O components 918, which may be configured to communicate with each other such as via a bus 902. The memory/storage 906 may include a memory 914, such as a main memory, or other memory storage, and a storage unit 916, both accessible to the processors 904 such as via the bus 902. The storage unit 916 and memory 914 store the instructions 910 embodying any one or more of the methodologies or functions described herein. The instructions 910 may also reside, completely or partially, within the memory 914, within the storage unit 916, within at least one of the processors 904 (e.g., within the processor's cache memory), or any suitable combination thereof, during execution thereof by the machine 900. Accordingly, the memory 914, the storage unit 916, and the memory of processors 904 are examples of machine-readable media.

The I/O components 918 may include a wide variety of components to receive input, provide output, produce output, transmit information, exchange information, capture measurements, and so on. The specific I/O components 918 that are included in a particular machine 900 will depend on the type of machine. For example, portable machines such as mobile phones will likely include a touch input device or other such input mechanisms, while a headless server machine will likely not include such a touch input device. It will be appreciated that the I/O components 918 may include many other components that are not shown in FIG. 9. The I/O components 918 are grouped according to functionality merely for simplifying the following discussion and the grouping is in no way limiting. In various example embodiments, the I/O components 918 may include output components 926 and input components 928. The output components 926 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 928 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 918 may include biometric components 930, motion components 934, environmental components 936, or position components 938 among a wide array of other components. For example, the biometric components 930 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 934 may include acceleration sensor components (e.g., accelerometer), gravitation sensor components, rotation sensor components (e.g., gyroscope), and so forth. The environmental components 936 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 938 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 918 may include communication components 940 operable to couple the machine 900 to a network 932 or devices 920 via coupling 924 and coupling 922, respectively. For example, the communication components 940 may include a network interface component or other suitable device to interface with the network 932. In further examples, communication components 940 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 920 may be another machine or any of a wide variety of peripheral devices (e.g., a peripheral device coupled via a USB).

Moreover, the communication components 940 may detect identifiers or include components operable to detect identifiers. For example, the communication components 940 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 940, such as, location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying instructions 910 for execution by the machine 900, and includes digital or analog communications signals or other intangible medium to facilitate communication of such instructions 910. Instructions 910 may be transmitted or received over the network 932 using a transmission medium via a network interface device and using any one of a number of well-known transfer protocols.

"CLIENT DEVICE" in this context refers to any machine 900 that interfaces to a communications network 932 to obtain resources from one or more server systems or other client devices. A client device may be, but is not limited to, a mobile phone, desktop computer, laptop, PDAs, smart phones, tablets, ultra books, netbooks, laptops, multi-processor systems, microprocessor-based or programmable consumer electronics, game consoles, STBs, or any other communication device that a user may use to access a network 932.

"COMMUNICATIONS NETWORK" in this context refers to one or more portions of a network 932 that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network 932 or a portion of a network 932 may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device or other tangible media able to store instructions 910 and data temporarily or permanently and may include, but is not be limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store instructions 910. The term "machine-readable medium" shall also be taken to include any medium, or combination of multiple media, that is capable of storing instructions 910 (e.g., code) for execution by a machine 900, such that the instructions 910, when executed by one or more processors 904 of the machine 900, cause the machine 900 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors 904) may be configured by software (e.g., an application 816 or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor 904 or other programmable processor 904. Once configured by such software, hardware components become specific machines 900 (or specific components of a machine 900) uniquely tailored to perform the configured functions and are no longer general-purpose processors 904. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor 904 configured by software to become a special-purpose processor, the general-purpose processor 904 may be configured as respectively different special-purpose processors (e.g., comprising different hardware components) at different times. Software accordingly configures a particular processor or processors 904, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses 902) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors 904 that are temporarily configured (e.g., by software) or permanently configured to perform the relevant operations. Whether temporarily or permanently configured, such processors 904 may constitute processor-implemented components that operate to perform one or more operations or functions described herein. As used herein, "processor-implemented component" refers to a hardware component implemented using one or more processors 904. Similarly, the methods described herein may be at least partially processor-implemented, with a particular processor or processors 904 being an example of hardware. For example, at least some of the operations of a method may be performed by one or more processors 904 or processor-implemented components. Moreover, the one or more processors 904 may also operate to support performance of the relevant operations in a "cloud computing" environment or as a "software as a service" (SaaS). For example, at least some of the operations may be performed by a group of computers (as examples of machines 900 including processors 904), with these operations being accessible via a network 932 (e.g., the Internet) and via one or more appropriate interfaces (e.g., an API). The performance of certain of the operations may be distributed among the processors 904, not only residing within a single machine 900, but deployed across a number of machines 900. In some example embodiments, the processors 904 or processor-implemented components may be located in a single geographic location (e.g., within a home environment, an office environment, or a server farm). In other example embodiments, the processors 904 or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands," "op codes," "machine code," etc.) and which produces corresponding output signals that are applied to operate a machine 900. A processor 904 may be, for example, a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC) or any combination thereof. A processor may further be a multi-core processor having two or more independent processors 904 (sometimes referred to as "cores") that may execute instructions 910 contemporaneously.

What is claimed is:

1. A method performed by one or more computer processors, comprising:
    gathering a first set of feature data for a first image of a first item, the first set of feature data including image features describing the first image;
    determining a first probability score for the first image by using the first set of feature data as input in a machine learning model, the first probability score indicating an estimated probability that the first image is suitable to represent the first item, the machine learning model having been trained to predict an image for a listing of an online marketplace based on a set of training images of the first item and sets of feature data associated with the set of training images;
    gathering a second set of feature data for a second image of the first item, the second set of feature data including image features describing the second image;
    determining a second probability score for the second image by using the second set of feature data as input in the machine learning model, the second probability score indicating an estimated probability that the second image is suitable to represent the first item; and
    selecting, based on a comparison of at least the first probability score and the second probability score, the first image to represent the first item.

2. The method of claim 1, wherein selecting the first image to represent the first item comprises:
    determining, based on the comparison of at least the first probability score and the second probability score, that the first probability score is greater than the second probability score.

3. The method of claim 1, wherein the first set of feature data for the first image also includes item features describing the first item.

4. The method of claim 1, wherein the first set of feature data for the first image also includes categorical features describing a category of items in which the first item is included.

5. The method of claim 1, wherein each training image from the set of training images is labeled to indicate whether a respective training image is suitable to represent the first item.

6. The method of claim 1, further comprising:
    gathering, a third set of feature data for a third image of the first item, the third set of feature data including image features describing the third image; and
    determining a third probability score for the third image by using the third set of feature data as input in the machine learning model, the third probability score indicating on estimated probability that the third image is suitable to represent the first item, wherein the comparison of at least the first probability score and the second probability score also includes the third probability score.

7. The method of claim 1, wherein the first image is selected to represent the first item by representing a category of items that encompasses the first item.

8. A system comprising:
    one or more computer processors; and
    one or more computer-readable mediums storing instructions that, when executed by the one or more computer processors, cause the system to perform operations comprising:
    gathering a first set of feature data for a first image of a first item, the first set of feature data including image features describing the first image;
    determining a first probability score for the first image by using the first set of feature data as input in a machine learning model, the first probability score indicating an estimated probability that the first image is suitable to represent the first item, the machine learning model having been trained to predict an image for a listing of an online marketplace based on a set of training images of the first item and sets of feature data associated with the set of training images;
    gathering a second set of feature data for a second image of the first item, the second set of feature data including image features describing the second image;
    determining a second probability score for the second image by using the second set of feature data as input in the machine learning model, the second probability score indicating an estimated probability that the second image is suitable to represent the first item; and
    selecting, based on a comparison of at least the first probability score and the second probability score, the first image to represent the first item.

9. The system of claim 8, wherein selecting the first image to represent the first item comprises:
    determining, based on the comparison of at least the first probability score and the second probability score, that the first probability score is greater than the second probability score.

10. The system of claim 8, wherein the first set of feature data for the first image also includes item features describing the first item.

11. The system of claim 8, wherein the first set of feature data for the first image also includes categorical features describing a category of items in which the first item is included.

12. The system of claim 8, wherein each training image from the set of training images is labeled to indicate whether a respective training image is suitable to represent the first item.

13. The system of claim 8, the operations further comprising:
   gathering, a third set of feature data for a third image of the first item, the third set of feature data including image features describing the third image; and
   determining a third probability score for the third image by using the third set of feature data as input in the machine learning model, the third probability score indicating on estimated probability that the third image is suitable to represent the first item, wherein the comparison of at least the first probability score and the second probability score also includes the third probability score.

14. The system of claim 8, wherein the first image is selected to represent the first item by representing a category of items that encompasses the first item.

15. A non-transitory computer-readable medium storing instructions that, when executed by one or more computer processors of one or more computing devices, cause the one or more computing devices to perform operations comprising:
   gathering a first set of feature data for a first image of a first item, the first set of feature data including image features describing the first image;
   determining a first probability score for the first image by using the first set of feature data as input in a machine learning model, the first probability score indicating an estimated probability that the first image is suitable to represent the first item, the machine learning model having been trained to predict an image for a listing of an online marketplace based on a set of training images of the first item and sets of feature data associated with the set of training images;
   gathering a second set of feature data for a second image of the first item, the second set of feature data including image features describing the second image;
   determining a second probability score for the second image by using the second set of feature data as input in the machine learning model, the second probability score indicating an estimated probability that the second image is suitable to represent the first item; and
   selecting, based on a comparison of at least the first probability score and the second probability score, the first image to represent the first item.

16. The non-transitory computer-readable medium of claim 15, wherein selecting the first image to represent the first item comprises:
   determining, based on the comparison of at least the first probability score and the second probability score, that the first probability score is greater than the second probability score.

17. The non-transitory computer-readable medium of claim 15, wherein the first set of feature data for the first image also includes item features describing the first item.

18. The non-transitory computer-readable medium of claim 15, wherein the first set of feature data for the first image also includes categorical features describing a category of items in which the first item is included.

19. The non-transitory computer-readable medium of claim 15, wherein each training image from the set of training images is labeled to indicate whether a respective training image is suitable to represent the first item.

20. The non-transitory computer-readable medium of claim 15, the operations further comprising:
   gathering, a third set of feature data for a third image of the first item, the third set of feature data including image features describing the third image; and
   determining a third probability score for the third image by using the third set of feature data as input in the machine learning model, the third probability score indicating on estimated probability that the third image is suitable to represent the first item, wherein the comparison of at least the first probability score and the second probability score also includes the third probability score.

* * * * *